US011543491B2

(12) United States Patent
Del Gaizo et al.

(10) Patent No.: US 11,543,491 B2
(45) Date of Patent: Jan. 3, 2023

(54) OPTIMIZED CURRENT PATH TO ENABLE FLAT MEMS MIRROR

(71) Applicant: GM Global Technology Operations LLC, Detroit, MI (US)

(72) Inventors: Steven A. Del Gaizo, Ferndale, MI (US); Scott Singer, San Gabriel, CA (US); Cornel Marxer, Neuchâtel (CH)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 262 days.

(21) Appl. No.: 16/865,922

(22) Filed: May 4, 2020

(65) Prior Publication Data

US 2021/0341575 A1   Nov. 4, 2021

(51) Int. Cl.
*G01S 7/481* (2006.01)
*G02B 26/08* (2006.01)

(52) U.S. Cl.
CPC ............ *G01S 7/481* (2013.01); *G02B 26/085* (2013.01)

(58) Field of Classification Search
None
See application file for complete search history.

(56) References Cited

U.S. PATENT DOCUMENTS

| | | | | |
|---|---|---|---|---|
| 5,606,447 A * | 2/1997 | Asada | ................ | G02B 26/0816 359/198.1 |
| 6,108,118 A * | 8/2000 | Minamoto | ........... | G02B 26/085 359/224.1 |
| 6,388,789 B1 * | 5/2002 | Bernstein | ............ | B81C 1/00214 359/198.1 |
| 2005/0099709 A1 * | 5/2005 | Iwasaki | ................ | G02B 26/085 359/872 |
| 2005/0122604 A1 * | 6/2005 | Kamiya | ............... | G02B 26/085 359/872 |
| 2020/0033453 A1 * | 1/2020 | Kuroki | ................ | G02B 26/101 |

* cited by examiner

*Primary Examiner* — Jennifer D. Carruth
(74) *Attorney, Agent, or Firm* — Cantor Colburn LLP

(57) ABSTRACT

A Lidar system, a mirror assembly for a Lidar system and method of operating the mirror assembly. The mirror assembly of the Lidar system includes a first frame and a first conductor. The first frame is rotatable about a first axis. The first conductor extends along the first frame to one side of the first axis. The first conductor extends through a first magnetic field on the one side of the first axis in a direction parallel to the first axis. A first current is passed through the first conductor to interact with the first magnetic field to induce a first rotation of the first frame about the first axis.

16 Claims, 2 Drawing Sheets

OPTIMIZED CURRENT PATH TO ENABLE FLAT MEMS MIRROR

INTRODUCTION

The subject disclosure relates to Lidar (Light detection and ranging) systems and, in particular, to a beam orientation device of a Lidar system and method of operation.

A Lidar system includes a light source for generating a light beam and a beam orientation device that redirects the light beam over an area of interest. The beam orientation device generally includes a mirror disposed on a frame that can be rotated about various axes. Current methods of rotating the frame includes passing a current through a magnetic field via a wire that crosses behind the mirror. The mirror therefore requires a metallic layer on its back side to separate it from the current. The metallic layer however causes stresses which increase a curvature of the mirror, thereby increasing a divergence of the laser beam. Beam divergence impacts a signal-to-noise ratio performance of the Lidar system, thereby impacting the capability of the Lidar system to detect objects. Accordingly, it is desirable to provide a current path for operation of the beam orientation device that allows the mirror to rotate without the need of a metallic layer.

SUMMARY

In one exemplary embodiment, a mirror assembly for a Lidar system is disclosed. The Lidar system includes a first frame and a first conductor. The first frame is rotatable about a first axis. The first conductor extends along the first frame to one side of the first axis. The first conductor extends through a first magnetic field on the one side of the first axis in a direction parallel to the first axis, and a first current passing through the first conductor interacts with the first magnetic field to induce a first rotation of the first frame about the first axis.

In addition to one or more of the features described herein, the first conductor is within a plane of the first frame and to a side of the first axis. The first magnetic field is on only the one side of the first axis. The first conductor follows a path through a first torsion bar associated with the first frame, along a first arm away from the first axis, along a cross bar parallel to the first axis, along a second arm toward the first axis and through a second torsion bar associated with the first frame. The cross bar passes through the first magnetic field. The mirror assembly further includes a second frame supporting the first frame via the first torsion bar and the second torsion bar, the second frame rotatable about a second axis. The second frame includes a second conductor passing through a second magnetic field to one side of the second axis, wherein a second current passing through the second conductor in the direction of the second axis interacts with the second magnetic field to induce a second rotation of the second frame about the second axis.

In another exemplary embodiment, a Lidar system is disclosed. The Lidar system includes a first frame and a first conductor. The first frame is rotatable about a first axis. The first conductor extends along the first frame to one side of the first axis. The first conductor extends through a first magnetic field on the one side of the first axis in a direction parallel to the first axis, and a first current passing through the first conductor interacts with the first magnetic field to induce a first rotation of the first frame about the first axis.

In addition to one or more of the features described herein, the first conductor is within a plane of the first frame and to a side of the first axis. The first magnetic field is on only the one side of the first axis. The first conductor follows a path through a first torsion bar associated with the first frame, along a first arm away from the first axis, along a cross bar parallel to the first axis, along a second arm toward the first axis and through a second torsion bar associated with the first frame. The cross bar passes through the first magnetic field. The Lidar system further includes a second frame supporting the first frame via the first torsion bar and the second torsion bar, the second frame rotatable about a second axis. The second frame includes a second conductor passing through a second magnetic field to one side of the second axis, wherein a second current passing through the second conductor in the direction of the second axis interacts with the second magnetic field to induce a second rotation of the second frame about the second axis.

In yet another exemplary embodiment, a method of operating a mirror assembly for a Lidar system is disclosed. A first frame is disposed along a first axis, the first frame having a first conductor to one side of the first axis and parallel to the first axis. A first current is passed through the first conductor through a first magnetic field on the one side of the first axis to induce a first rotation of the first frame about the first axis via interaction of the first current with the first magnetic field.

In addition to one or more of the features described herein, the first magnetic field is on only the one side of the first axis. The first current is passed along a path through a first torsion bar associated with the first frame, along a first arm away from the first axis, along a cross bar parallel to the first axis, along a second arm toward the first axis and through a second torsion bar associated with the first frame. The cross bar includes the first conductor and passes through the first magnetic field. The method further includes supporting the first frame in a second frame via the first torsion bar and the second torsion bar, the second frame rotatable about a second axis. A second current is passed through a second conductor of the second frame through a second magnetic field to one side of the second axis, the second conductor aligned along the second axis, in order to induce a second rotation of the second frame about the second axis via interaction of the second current with the second magnetic field.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
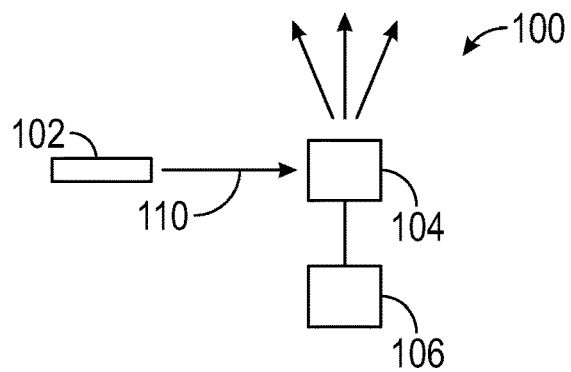
FIG. 1 shows a beam generating device suitable for use in a Lidar (Light detection and ranging) system.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a beam generating device 100 suitable for use in a Lidar (Light detection and ranging) system. In one embodiment, the Lidar system can be conveyed by a vehicle and used with a navigation system of the vehicle to navigate the vehicle through an area of interest. The Lidar system can distribute a light beam through the area of interest and receive one or more reflections of the light beam from one or more objects in the area of interest in order to determine a distance/range to the one or more objects and/or a location of the one or more objects. The navigation system can then navigate the vehicle through the area of interest based on the distance to and/or location of the one or more objects, generally to avoid contact or collision with the one or more objects.

The beam generating device 100 includes a laser 102 or other light source, a mirror assembly 104 and a control unit 106 for controlling an operation of the mirror assembly 104. The mirror assembly 104 can be a microelectromechanical (MEMS) device in various embodiments. The laser 102 generates a light beam 110 which is directed toward the mirror assembly 104. The mirror assembly 104 reflects or redirects the light beam 110 toward the area of interest. The control unit 106 controls movement of the mirror assembly 104 in order to control the redirection of the light beam 110 from the mirror assembly 104. The control unit 106 is further capable of determining various parameters of the one or more objects in the area of interest via a comparison of the light beam 110 and the reflections from the one or more objects. In particular, the control unit 106 is able to determine range and location of the one or more objects.

Figure 2:
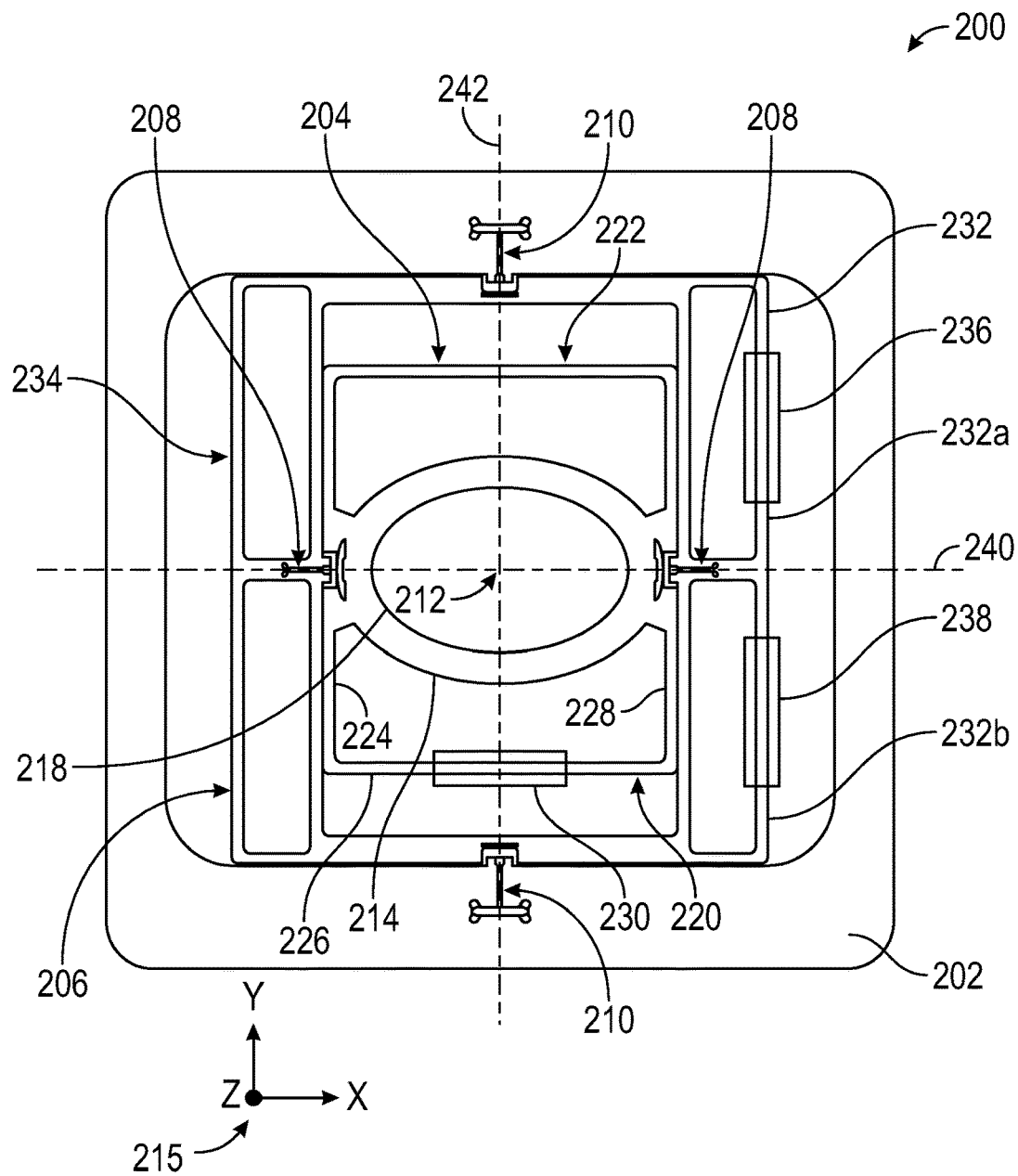
FIG. 2 shows a beam orientation device suitable for use in the mirror assembly of the beam generating device, in an embodiment.

FIG. 2 shows a beam orientation device 200 suitable for use in the mirror assembly 104 of the beam generating device 100, in an embodiment. A coordinate system 215 is shown for ease of explanation. The beam orientation device 200 includes a support structure 202, a first frame 204 (also referred to herein as an inner frame) and a second frame 206 (also referred to herein as an outer frame). For the given coordinate system 215, the support structure 202 lies within or defines an x-y plane.

The first frame 204 is rotationally coupled to the second frame 206 via a first set of torsion bars 208 in order to rotate about a first axis 240 (first rotational axis) that passes through a first set of torsion bars 208. The second frame 206 is rotationally coupled to the support structure 202 via a second set of torsion bars 210 in order to rotate about a second axis 242 (second rotation axis) that passes through a second set of torsion bars 210. The first axis 240 and the second axis 242 meet at a center 212 of the first frame 204. When the first frame 204 and second frame 206 are lying within the x-y plane, the first axis 240 is parallel to the x-axis of the coordinate system 215, and the second axis 242 is parallel to the y-axis.

The first set of torsion bars 208 connect the first frame 204 to the second frame 206 and allow the first frame 204 to rotate in and out of the plane of the second frame about the first axis. The second set of torsion bars 210 connect the second frame 206 to the support structure 202 and allow the second frame 206 to rotate in and out of the plane of the support structure 202 about the second axis.

The first frame 204 includes a central region 214 for supporting or including a mirror 218 thereon. The first frame 204 further includes a first inner frame handle 220 extending to one side of the central region 214 and a second inner frame handle 222 extending to an opposite side of the central region 214. With respect to the first axis 240, the first inner frame handle 220 lies in a −y half-plane with respect to the center 212 and the second inner frame handle 222 lies in a +y half-plane. The first inner frame handle 220 includes a first arm 224 extending from the first axis 240, a cross bar 226 extending parallel to the first axis 240 and a second arm 228 extending from the first axis 240. The cross bar 226 extends through a first magnetic field 230. A first wire or first conductor is disposed on the cross bar 226. A first current is passed through the first conductor in order to control rotation of the first frame 204 about the first axis 240, as discussed in detail with respect to FIGS. 3 and 4.

Still referring to FIG. 2, the second inner frame handle 222 has a geometry similar to that of the first inner frame handle 220. However, the second inner frame handle 222 does not include a wire thereon and the cross bar of the second inner frame handle 222 does not pass through a magnetic field. It is to be understood however that the selection of which handle (either the first inner frame handle 220 or the second inner frame handle 222) has the wire and associated magnetic field and which does not is not considered a limitation of the invention.

The second frame 206 includes a central void within which the first frame 204 can rotate. The second frame 206 includes a first outer frame cross bar 232 along its +x edge and a second outer frame cross bar 234 along its −x edge. The first outer frame cross bar 232 and second outer frame cross bar 234 extend parallel to the second axis. The first outer frame cross bar 232 has a first segment 232a and second segment 232b. The first segment 232a is disposed within a second magnetic field 236 and the second segment 232b is disposed within a third magnetic field 238. A second wire or second conductor (not shown) extends along the first segment 232a and the second segment 232b. A current is induced in the second conductor to interact with the second magnetic field 236 and third magnetic field 238, thereby controlling rotation of the second frame 206 about the second axis 242.

In FIG. 2, the second wire, second magnetic field 236 and third magnetic field 238 are associated with the first outer frame cross bar 232. The second outer frame cross bar 234 does not have any wires or magnetic fields associated with it. It is to be understood however that the selection of which outer frame cross bar (either the first outer frame cross bar 232 or the second outer frame cross bar 234) includes the wire and associated magnetic fields and which does not is not considered a limitation of the invention. In yet another embodiment, both the first outer frame cross bar 232 and the second outer frame cross bar 234 have a wire and associated magnetic fields.

Figure 3:
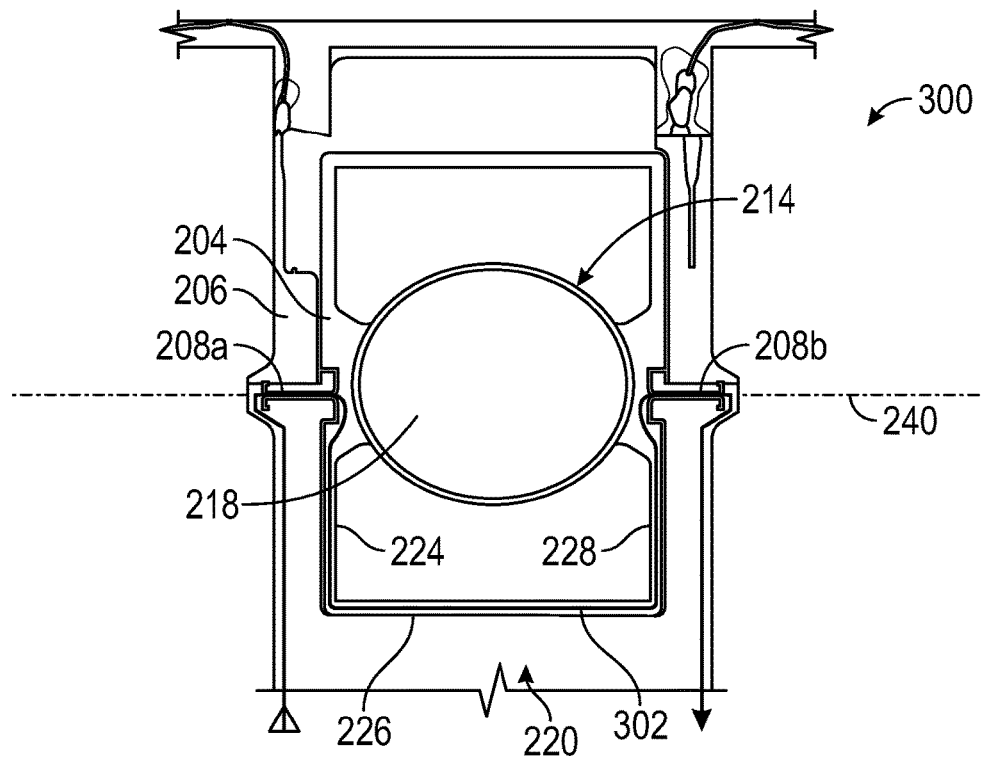
FIG. 3 shows a close-up of the first frame of the beam orientation device, illustrating a conductive path for a first current through the first frame in order to control a rotation of the first frame.

FIG. 3 shows a close-up 300 of the first frame 204 of the beam orientation device 200, illustrating a conductive path for a first current through the first frame 204 in order to control a rotation of the first frame 204. A first wire or first conductor 302 passes from the second frame 206 to the first frame 204 via a first torsion bar 208a. The first conductor 302 follows a path along the first arm 224 away from the first axis 240, then along the cross bar 226 parallel to the first axis, and along the second arm 228 toward the first axis 240.

The first conductor 302 then passes from the first frame 204 to the second frame 206 via the second torsion bar 208b. The cross bar 226 is disposed within an external magnetic field shown in FIG. 4, and a first current flowing through the first conductor 302 passes through the external magnetic field.

The first conductor 302 passes through the first frame 204 without crossing through the central region 214 of the first frame 204. Therefore, the mirror 218 can be disposed in the central region 214 without the need for a metallic layer as a backing of the mirror, which otherwise is needed as a barrier between the mirror and the first conductor 302. As a result, the mirror 218 is freed from any stresses that would otherwise be induced by the metallic layer. A radius of curvature of the mirror 218 without the metallic layer is greater than a radius of curvature for the mirror with the metallic layer. In other words, the mirror without the metal layer more closely approximates a planar mirror.

Figure 4:
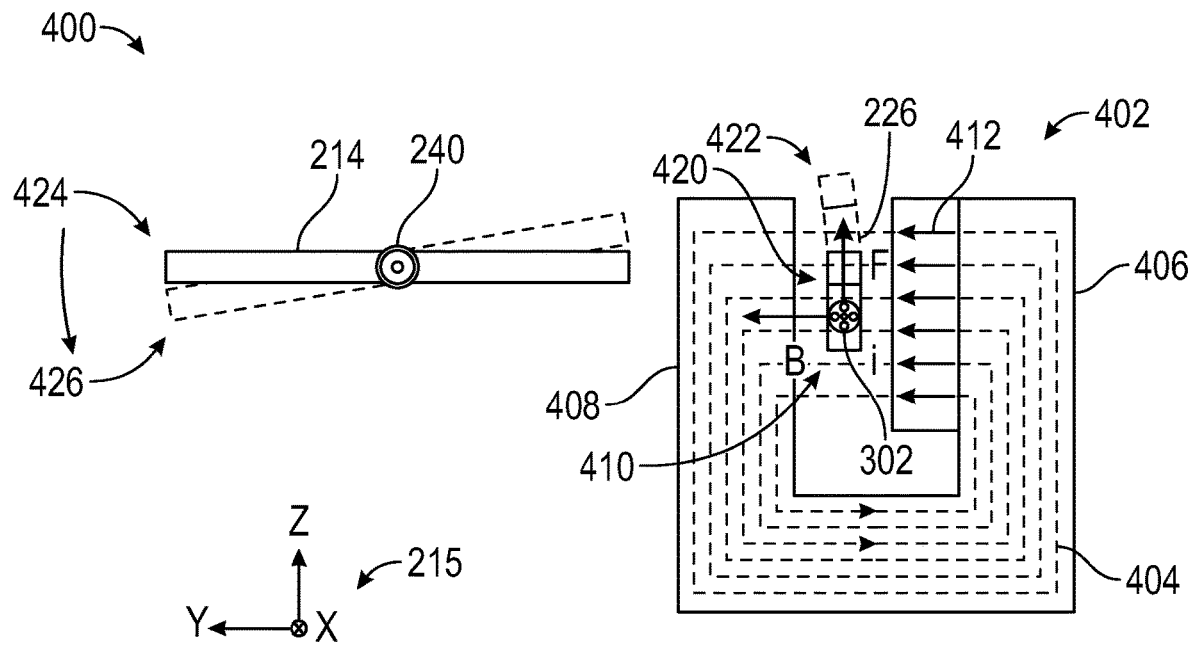
FIG. 4 shows a side cross-sectional view of the first frame illustrating an interaction of a first current associated with the first frame with an external magnetic field in order control movement of the first frame.

FIG. 4 shows a side cross-sectional view 400 of the first frame 204 illustrating an interaction of a first current associated with the first frame 204 with an external magnetic field in order control movement of the first frame 204. A magnet assembly 402 includes a base 404, a first prong 406 extending from the base 404 and a second prong 408 extending from the base 404 and separated from the first prong 406 by a selected distance to define a cavity 410.

A magnet 412, such as a permanent magnet, is disposed on the first prong 406. The magnet 412 provides a magnetic field within the cavity 410, the magnetic field being oriented in the +y direction. The cross bar 226 of the first frame 204 extends through the cavity 410 along the x-axis, therefore conducting the first current through the cavity 410 along the x-axis. As the first current passes through the magnetic field, a force is induced on the cross bar 226 in the z-direction, thereby inducing a first rotation on the first frame 204. The first rotation can be either clockwise or counterclockwise. Passing the first current in a +x direction induces a counterclockwise rotation about the x-axis (i.e., first axis 240), as shown in FIG. 4. The cross bar 226 and first conductor 302 are forced from a first position 420 to a second position 422, thereby causing the central region 214 to rotate from a first angular orientation 424 to a second angular orientation 426. Alternatively, passing the first current in a −x direction induces a clockwise rotation about the x-axis. Passing an alternating current through the cross bar 226 therefore induces an oscillation of the first frame 204 about the first axis 240.

The magnetic assembly shown in FIG. 4 induces the first magnetic field 230 shown in FIG. 2. It is to be understood that the magnetic assembly can be placed at a different location and magnetic field orientation to produce one or more of second magnetic field 236 and third magnetic field 238. The second current through these magnetic field can therefore be used to induce a second rotation on the second frame 206.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A mirror assembly for a Lidar system, comprising:
a first frame rotatable about a first axis, the first frame including a cross bar to one side of the first axis and parallel to the first axis, the cross bar passing through a first magnetic field on the one side of the first axis;
a second frame rotatable about a second axis, wherein the first frame is supported within the second frame via a first torsion bar on the first axis and a second torsion bar on the first axis; and
a first conductor extending from the second frame to the first frame along the first torsion bar, across the first frame along only one side of the first axis via the cross bar, and from the first frame to the second frame along the second torsion bar, wherein a first current passing through the first conductor at the cross bar interacts with the first magnetic field to induce a first rotation of the first frame about the first axis.

2. The mirror assembly of claim 1, wherein the first conductor is within a plane of the first frame.

3. The mirror assembly of claim 1, wherein the first magnetic field is on only the one side of the first axis.

4. The mirror assembly of claim 1, wherein the first conductor follows a path through the first torsion bar associated with the first frame, along a first arm away from the first axis, along the cross bar parallel to the first axis, along a second arm toward the first axis and through the second torsion bar associated with the first frame.

5. The mirror assembly of claim 4, wherein the cross bar passes through the first magnetic field claim 1, further comprising a mirror in a central region of the first frame, wherein the cross bar is separate from the central region.

6. The mirror assembly of claim 1, wherein the second frame includes a second conductor passing along only one side of the second axis and parallel to the second axis through a second magnetic field on the only one side of the second axis, wherein a second current passing through the second conductor interacts with the second magnetic field to induce a second rotation of the second frame about the second axis.

7. A Lidar system, comprising:
a first frame rotatable about a first axis, the first frame including a cross bar to one side of the first axis and parallel to the first axis, the cross bar passing through a first magnetic field on the one side of the first axis;
a second frame rotatable about a second axis, wherein the first frame is supported within the second frame via a first torsion bar on the first axis and a second torsion bar on the first axis; and
a first conductor extending from the second frame to the first frame along the first torsion bar, across the first frame along only one side of the first axis via the cross bar, and from the first frame to the second frame along the second torsion bar, wherein a first current passing through the first conductor interacts with the first magnetic field to induce a first rotation of the first frame about the first axis.

8. The Lidar system of claim 7, wherein the first conductor is within a plane of the first frame.

9. The Lidar system of claim 7, wherein the first magnetic field is on only the one side of the first axis.

10. The Lidar system of claim 7, wherein the first conductor follows a path through the first torsion bar associated with the first frame, along a first arm away from the first axis, along the cross bar parallel to the first axis, along a second arm toward the first axis and through the second torsion bar associated with the first frame.

11. The Lidar system of claim 7, further comprising a mirror in a central region of the first frame, wherein the cross bar is separate from the central region.

12. The Lidar system of claim 7, wherein the second frame includes a second conductor passing along only one side of the second axis and parallel to the second axis through a second magnetic field on the only one side of the second axis, wherein a second current passing through the second conductor in the direction of the second axis interacts with the second magnetic field to induce a second rotation of the second frame about the second axis.

13. A method of operating a mirror assembly for a Lidar system, comprising:
 disposing a first frame along a first axis, the first frame having a cross bar to one side of the first axis and parallel to the first axis, the cross bar passing through a first magnetic field on the one side of the first axis;
 disposing a second frame about a second axis, wherein the first frame is supported within the second frame via a first torsion bar on the first axis and a second torsion bar n the first axis; and
 passing a first current through a first conductor that extends from the second frame to the first frame along the first torsion bar, across the first frame along only the one side of the first axis via the cross bar, and from the first frame to the second frame along the second torsion bar, wherein passing the first current through the first conductor induces a first rotation of the first frame about the first axis via interaction of the first current with the first magnetic field.

14. The method of claim 13, further comprising passing the first current along a path through the first torsion bar associated with the first frame, along a first arm away from the first axis, along the cross bar parallel to the first axis, along a second arm toward the first axis and through the second torsion bar associated with the first frame.

15. The method of claim 13, wherein the first frame includes a mirror in a central region and the cross bar is separate from the central region.

16. The method of claim 13, further comprising passing a second current through a second conductor of the second frame through a second magnetic field to one side of the second axis, the second conductor aligned along the second axis, in order to induce a second rotation of the second frame about the second axis via interaction of the second current with the second magnetic field.

* * * * *